Oct. 13, 1953  C. E. TACK ET AL  2,655,226
DUPLEX BRAKE
Filed March 16, 1951  2 Sheets-Sheet 1

INVENTORS.
Carl E. Tack
William J. Casey, III.
BY
Atty.

Oct. 13, 1953 C. E. TACK ET AL 2,655,226
DUPLEX BRAKE
Filed March 16, 1951 2 Sheets-Sheet 2

INVENTORS.
Carl E. Tack
William J. Casey, III.
BY
Atty.

Patented Oct. 13, 1953

2,655,226

UNITED STATES PATENT OFFICE 2,655,226

DUPLEX BRAKE

Carl E. Tack, Chicago, and William J. Casey III, Highland Park, Ill., assignors to American Steel Foundries, Chicago, Ill., a corporation of New Jersey Application March 16, 1951, Serial No. 215,892

20 Claims. (Cl. 188—59)

This invention relates to railway brake equipment and is more particularly concerned with the provision of an off-wheel brake arrangement embodying braking means for decelerating one or more disks or rotors associated with the wheel and axle assemblies of a railway car truck.

The present invention contemplates the provision of an off-wheel brake arrangement in which a brake frame is carried by the truck frame to support a pair of levers provided with brake shoes for frictional engagement with opposite sides of a disk, the disk being supported for rotation with a wheel and axle assembly which, in turn, is mounted for vertical, lateral, longitudinal and universal movements relative to the truck frame, in a manner well known in the art. To obtain full-face engagement between the brake shoes and the disks, irrespective of the relative movements between the truck frame and a wheel and axle assembly, it will be appreciated that the brake frame and its brake shoes must be properly positioned and maintained in such position with respect to the disk. It is, therefore, an object of the present invention to provide a brake arrangement in which the brake frame is supported for limited movements relative to the truck frame and adapted to be adjustably positioned relative to its associated disk to insure full-face engagement between the brake shoes and the friction faces of the disk.

This invention further contemplates the provision of a brake arrangement in which a brake frame housing is resiliently supported in mounting brackets connected to the truck frame, the brake frame housing having a torque arm mounted thereon for engagement with one of the mounting brackets to properly position the brake shoes in full-face engagement with the associated disk.

This invention further contemplates the provision of a brake arrangement in which the torque arm is connected to a supporting bracket by means of a connecting link adapted to be adjusted to various lengths.

This invention further contemplates the provision of abutment means provided on the brake frame housing and mounting brackets to limit rotational movement of the housing relative to the mounting brackets.

This invention further contemplates the provision of an off-wheel brake arrangement adapted to be assembled by the manufacturer and shipped as a complete unit for installation on a truck frame by merely welding and/or bolting the mounting brackets thereto.

This invention further contemplates the provision of an off-wheel brake arrangement which is relatively simple and inexpensive to manufacture and reliable in use.

This invention embodies other novel features, details of construction and arrangement of parts which are hereinafter set forth in the specification and claims and illustrated in the accompanying drawings wherein:

Figure 1:
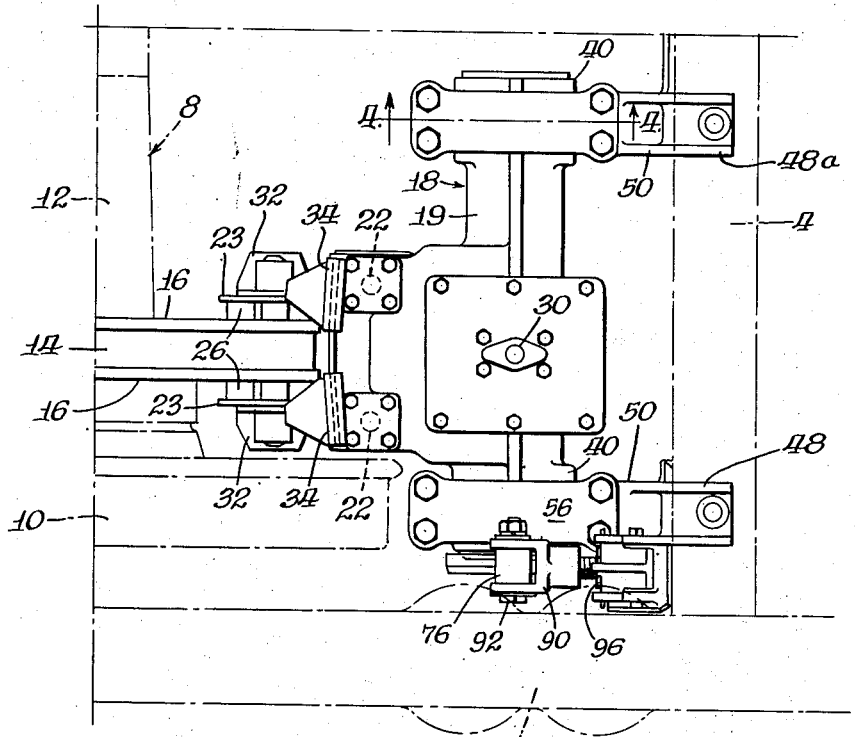
Figure 1 is a fragmentary top plan view illustrating an off-wheel brake arrangement embodying features of the present invention.
Figure 2:
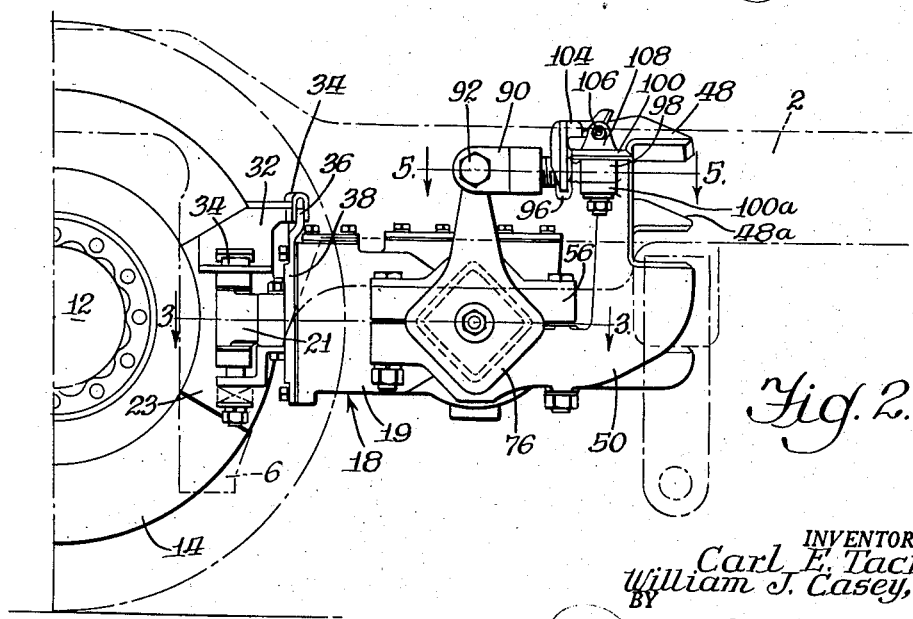
Figure 2 is a side elevational view of same.
Figure 3:
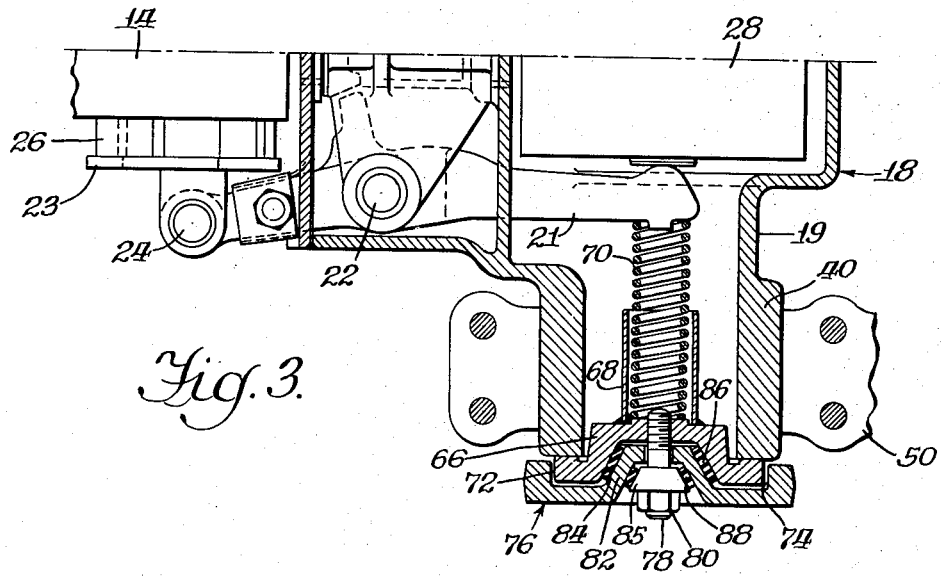
Figure 3 is a sectional view taken along the line 3—3 of Figure 2.
Figure 5:
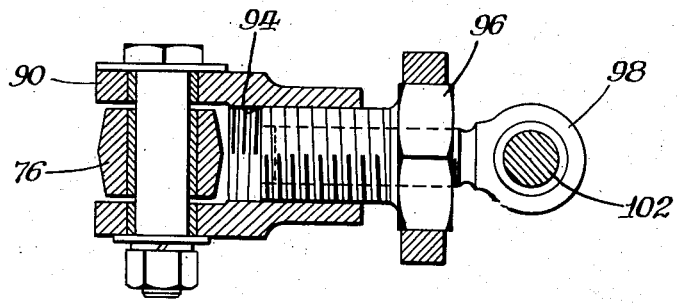
Figure 5 is a detail sectional view taken along the line 5—5 of Figure 2.

Referring now to the drawings, for a better understanding of the present invention, the brake is shown as supplied to a conventional railway car truck embodying a pair of side rails 2—2 secured in spaced parallel relation by means of a pair of transoms 4—4. The side rails are provided at their ends with pedestal jaws 6—6 defining openings 7—7 to receive journal boxes (not shown) adapted to engage the ends of wheel and axle assemblies 8, each comprising a pair of wheels 10—10 secured adjacent the ends of an axle 12. A friction disk 14 is secured to each wheel 10 by means of studs and nuts for common rotational movement and each disk is provided with friction faces 16—16 on opposite sides thereof.

A brake frame indicated generally at 18 is shown as comprising a housing 19 having a pair of brake levers 21—21 pivotally mounted thereon at 22—22 and projecting outwardly along opposite sides of the friction disk 14. Brake heads 23—23 are pivotally mounted on the outer ends of the brake levers 21—21 by means of bolts 24—24 and are each provided with a brake shoe 26 for frictional braking engagement with the friction surfaces 16—16 of the disk 14.

Figure 4:
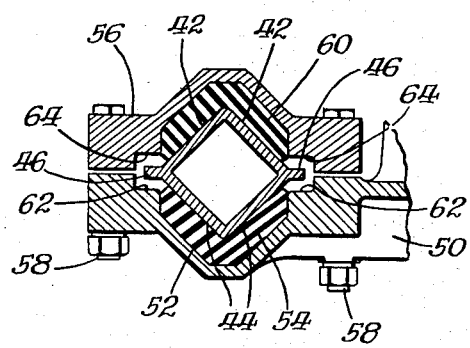
Figure 4 is a transverse sectional view taken along the line 4—4 of Figure 1.

A brake cylinder 28, or other conventional power means, is mounted within the housing 19 to actuate the brake levers 21—21. The brake cylinder 28 is connected to the end of a fluid supply line 30. A guide plate 32 is secured in abutting engagement against the outer side of each brake head 23 by means of the pivot bolt 24 and is formed with a channel-shaped portion 34 to slidably receive a guide flange 36 projecting upwardly from a cover plate 38 bolted to the housing 19. As illustrated in Figure 1, the guide flanges 34—34 are diagonally arranged to converge toward the disk 14. The construction and operation of the guide plates 32—32 and guide flanges 36—36 is more particularly shown and described in a copending application, Serial No. 211,515, filed February 17, 1951, in the name William J. Casey III. The housing 19 is formed at its sides with coaxial trunnions or extensions 40—40 which are preferably quadrangular in cross section to provide a pair of upwardly converging flat surfaces 42—42 and a pair of downwardly converging flat surfaces 44—44. Abutment flanges 46—46 are provided along opposite sides of the extensions 40—40. A pair of mounting brackets 48—48a are disposed in spaced relation to support the housing 19, and each bracket comprises an arm 50 adapted to be welded and/or bolted to the transom 4 of a truck frame. Each arm 50 is formed with a V-shaped recess 52 to receive a resilient rubber pad 54. A cap 56 is secured to each arm 50 by means of bolts 58 and is formed with an inverted V-shaped recess to receive a resilient rubber pad 60. As illustrated in Figure 4, the arm 50 and cap 56 define a quadrangular opening 59 substantially conforming in shape to contour of the extensions 40.

In assembling the mounting brackets 48—48a each arm 50 and cap 56 act to snugly engage the resilient rubber pads 54 and 60 against the surfaces 44—44 and 42—42 respectively of the extensions 40—40. The means herein disclosed for resiliently supporting the housing 19 upon the mounting brackets 48—48a, is somewhat similar to the construction shown and described in a copending application, Serial No. 104,453, filed July 13, 1949, in the name of Carl E. Tack. Each arm 50 is formed with a pair of abutment shoulders 62—62, and each cap 56 is formed with a pair of abutment shoulders 64—64. The abutment shoulders 62—62 and 64—64 extend in spaced parallel relation along opposite sides of the abutment flanges 46—46 provided on the extensions 40—40 of the housing 19 and serve to limit the relative rotational movement between the housing 19 and the mounting brackets 48—48a.

An adapter plate 66 is welded or otherwise secured to the outer end of an extension 40 and provided with a cylindrical spring retainer 68 to enclose a portion of a helical compression spring 70 interposed between the adapter and the adjacent brake lever 21. The outer periphery 72 of the adapter is preferably formed square for insertion into a square recess 74 formed in a torque arm 76. It is desirable that some clearance should be provided between the peripheral surface 72 and the surfaces defining the recess 74 to permit limited movement of the torque arm relative to the adapter 66. The torque arm 76 is secured to the adapter 66 by means of a stud 78 and nut 80. The torque arm is preferably formed with a frusto-conical portion 82 disposed within a frusto-conical recess 84 formed in the adapter 66. To provide limited universal movement of the torque arm relative to the adapter, a resilient rubber bushing 86 is disposed between the frusto-conical portion 82 and the surface defining the recess 84 in the adapter. A frusto-conical sleeve 85 is slidably mounted upon the stud 78 to engage a resilient bushing 88 disposed against the inner surface of the frusto-conical portion 82.

The outer end of the torque arm 76 is pivotally connected to an adjusting jaw 90 by means of a pin 92. The adjusting jaw is internally threaded at 94 to receive an externally threaded adjusting nut 96. The adjusting nut 96 is internally threaded to receive an adjusting screw 98 which is pivotally connected to a pair of spaced flanges 100—100a by means of a pin 102, the flanges being preferably formed integral with the arm 50 of the mounting bracket 48. A latch 104 is pivotally connected by means of a bolt 106 to a pair of ears 108—108 formed on the flange 100. The free end of the latch 104 is bifurcated to snugly receive and engage opposing flat sides of the adjusting nut 96. The internal and external surfaces of the adjustment nut 96 are reversely threaded to cause the adjusting jaw and adjusting screw to be moved toward or away from each other responsive to rotational movement of the nut.

In the construction, installation and operation of the rotor brake apparatus thus shown and described it will be noted that the brake frame 18 and the various parts secured or attached thereto are adapted to be assembled and shipped as a complete unit ready for mounting upon the transom of a railway car truck frame by merely welding and/or bolting the mounting flanges 48—48a thereto. After the brake frame 18 has been mounted upon the transom, the adjustment nut 96 may be rotated to properly position the brake shoes 26—26 in full-face engagement against opposite faces 16—16 of the friction disk 14. The latch 104 is then pivoted into position to engage the adjusting nut 96 against further rotational movement. When the apparatus is actuated to apply a braking force to the friction disk 14, it will be noted that the resilient rubber pads 54 and 60 first act to yieldably resist rotational movement of the brake frame 18 relative to the mounting brackets 48—48a. The torque arm 76 is provided to confine the rotational movement of the brake frame 18 within predetermined limits. The flanges 46—46 on the extensions 40—40 are provided for abutting engagement against the abutment shoulders 62—62 and 64—64 to serve as stops to limit the rotational movement of the brake frame 18 relative to the mounting brackets 48—48a if, for any reason, the torque arm should become inoperative to restrain such movement. It will also be noted that the torque arm 76 is mounted for limited universal movement relative to the adapter 66 to accommodate various movements of the brake frame 18 during operation of the braking apparatus in service.

While this invention has been shown in but one form it is obvious to those skilled in the art that it is not so limited but is susceptible of various changes and modifications without departing from the spirit and scope of the claimed invention.

We claim:

1. In a brake arrangement for railway car trucks, a brake frame housing having a pair of coaxial noncircular extensions, a pair of supporting brackets having noncircular openings to receive said extensions, resilient pads provided within said openings to snugly engage said extensions, a torque arm mounted on said housing, and means to connect said arm to one of said supporting brackets.

2. In a brake arrangement for railway car trucks, a brake frame housing having a pair of coaxial noncircular extensions, a pair of supporting brackets having noncircular openings to receive said extensions, resilient pads provided within said openings to snugly engage said extensions, a torque arm mounted on said housing, and a connecting link to connect said arm to one of said supporting brackets.

3. In a brake arrangement for a railway car truck, a truck frame, a brake frame housing having a pair of coaxial noncircular trunnions, a pair of supporting brackets secured to said truck frame and having noncircular openings to receive said trunnions, resilient pads provided within said openings to snugly engage said trunnions, and a torque arm resiliently mounted for limited universal movement on said housing and connected to one of said supporting brackets.

4. In a brake arrangement for a railway car truck, a truck frame, a brake frame housing having a pair of coaxial noncircular trunnions, a pair of supporting brackets secured to said truck frame and having noncircular openings to receive said brake trunnions, resilient pads provided within said openings to snugly engage said trunnions, and a torque arm resiliently mounted for limited universal movement on said housing and adjustably connected to one of said supporting brackets.

5. In a brake arrangement for a railway car truck having a frame with spaced side rails and spaced transoms connected therebetween; the combination of a brake frame, a pair of spaced mounting brackets on a transom, resilient pads on said brackets to resiliently support said frame for universal movement relative to said brackets, and a torque arm mounted on said brake frame and connected to one of said brackets.

6. In a brake arrangement for a railway car truck having a truck frame with a transverse member, and having a wheel and axle assembly supporting said frame; the combination of a brake frame, a pair of spaced mounting brackets on said member, resilient pads on said brackets resiliently supporting said frame for universal movement relative to said brackets, and a torque arm mounted for limited universal movement on said brake frame and connected to one of said brackets.

7. In a brake arrangement for a railway car truck, a brake frame including a housing, a pair of spaced mounting brackets, resilient pads on said brackets to engage and resiliently support said housing for universal movement relative to said brackets, a torque arm mounted for limited universal movement on said housing and connected to one of said brackets, and means to vary the position of said arm relative to its associated bracket.

8. In a brake arrangement for a railway car truck, a brake frame including a housing, a pair of spaced mounting brackets to resiliently support said housing for relative universal movement, a torque arm mounted for limited universal movement on said housing and connected to one of said brackets, and means to vary the position of said arm relative to its associated bracket, said housing being resiliently supported on said brackets by means of resilient pads interposed therebetween.

9. In a brake arrangement for a railway car truck, a brake frame including a housing, a pair of spaced mounting brackets to resiliently support said housing for relative universal movement, a torque arm mounted for limited universal movement on said housing and connected to one of said brackets, and means to vary the position of said arm relative to its associated bracket, said housing being resiliently supported on said brackets by means of resilient pads interposed therebetween, said resilient pads being formed and arranged to yieldably resist rotational movement of said housing relative to said brackets.

10. In a brake arrangement for a railway car truck, a brake frame including a housing, a pair of spaced mounting brackets to resiliently support said housing for relative universal movement, a torque arm mounted for limited universal movement on said housing and connected to one of said brackets, and means to vary the position of said arm relative to its associated bracket, said housing being resiliently supported on said brackets by means of resilient pads interposed therebetween, said resilient pads being formed and arranged to yieldably resist rotational movement of said housing relative to said brackets, and abutment means formed on said housing and brackets to limit rotational movement of the housing relative to the brackets.

11. In a brake arrangement for a railway car truck, a wheel and axle assembly including a friction disk rotatable therewith, a truck frame, a pair of spaced supporting brackets secured to said truck frame and formed with coaxial quadrangular apertures, a brake frame comprising a housing having a pair of noncircular extensions disposed within said apertures, resilient pads mounted within said apertures to engage and yieldably resist rotational movement of said housing relative to said brackets, brake levers pivotally mounted on said housing and disposed at opposite sides of said friction disk, brake shoes supported on said levers to frictionally engage opposite sides of said disk, and a torque arm mounted on said housing and connected to one of said brackets.

12. In a brake arrangement for a railway car truck, a wheel and axle assembly including a friction disk rotatable therewith, a truck frame, a pair of spaced supporting brackets secured to said truck frame and formed with coaxial quadrangular apertures, a brake frame comprising a housing having a pair of noncircular extensions disposed within said apertures, resilient pads mounted within said apertures to engage and yieldably resist rotational movement of said housing relative to said brackets, brake levers pivotally mounted on said housing and disposed at opposite sides of said friction disk, brake shoes supported on said levers to frictionally engage opposite sides of said disk, and a torque arm resiliently mounted for limited universal movement on said housing and connected to one of said brackets.

13. In a brake arrangement for a railway car truck, a wheel and axle assembly including a friction disk rotatable therewith, a truck frame, a pair of spaced supporting brackets secured to said truck frame and formed with coaxial quadrangular apertures, a brake frame comprising a housing having a pair of noncircular extensions disposed within said apertures, resilient pads mounted within said apertures to engage and yieldably resist rotational movement of said housing relative to said brackets, brake levers pivotally mounted on said housing and disposed at opposite sides of said friction disk, brake shoes supported on said levers to frictionally engage opposite sides of said disk, and a torque arm resiliently mounted for limited universal movement on said housing and connected to one of said brackets, said torque arm being connected to its associated bracket by means of a connecting link.

14. In a brake arrangement for a railway car truck, a wheel and axle assembly including a friction disk rotatable therewith, a truck frame, a pair of spaced supporting brackets secured to said truck frame and formed with coaxial quadrangular apertures, a brake frame comprising a housing having a pair of noncircular extensions disposed within said apertures, resilient pads mounted within said apertures to engage and yieldably resist rotational movement of said housing relative to said brackets, brake levers pivotally mounted on said housing and disposed at opposite sides of said friction disk, brake shoes supported on said levers to frictionally engage opposite sides of said disk, and a torque arm resiliently mounted for limited universal movement on said housing and connected to one of said brackets, said torque arm being connected to its associated bracket by means of a connecting link, and means to vary the length of said connecting link to adjust the position of the brake shoes relative to said disk.

15. In a brake arrangement for a railway car truck, a wheel and axle assembly including a friction disk rotatable therewith, a truck frame, a pair of spaced supporting brackets secured to said truck frame and formed with coaxial quadrangular apertures, a brake frame comprising a housing having a pair of noncircular extensions disposed within said apertures, resilient pads mounted within said apertures to engage and yieldably resist rotational movement of said housing relative to said brackets, brake levers pivotally mounted on said housing and disposed at opposite sides of said friction disk, brake shoes supported on said levers to frictionally engage opposite sides of said disk, and a torque arm resiliently mounted for limited universal movement on said housing and connected to one of said brackets, said torque arm being connected to its associated bracket by means of a connecting link, and means to vary the length of said connecting link to adjust the position of the brake shoes relative to said disk, and abutment means formed on said housing and brackets to limit rotational movement of the housing relative to the brackets.

16. In a brake arrangement for a railway car truck, a brake frame housing, coaxial extensions formed on opposite sides of said housing, a pair of mounting brackets formed with openings to receive said extensions, resilient members disposed in said openings to engage and yieldably resist movements of the housing relative to said brackets, a torque arm mounted on said housing to resist rotational movement of the latter relative to said brackets, a connecting link means connecting said arm to the adjacent mounting bracket, and means to vary the length of said connecting link means.

17. In a brake arrangement for a railway car truck, a brake frame housing, coaxial extensions provided on opposite sides of said housing, a pair of spaced mounting brackets formed with quadrangular openings to receive said extensions, resilient pads disposed in said openings to engage and yieldably resist movements of the housing relative to said brackets, an adapter secured on the end of one of said extensions, a torque arm resiliently mounted for limited universal movement on said adapter to yieldably resist rotational movement of said housing relative to said brackets, a connecting link means connecting said arm to the adjacent bracket, and means to vary the length of said connecting link means.

18. In a brake arrangement for a railway car truck, a brake frame housing, coaxial extensions provided on opposite sides of said housing, a pair of spaced mounting brackets formed with quadrangular openings to receive said extensions, resilient pads disposed in said openings to engage and yieldably resist movements of the housing relative to said brackets, an adapter secured on the end of one of said extensions, a torque arm resiliently mounted for limited universal movement on said adapter to resist rotational movement of said housing relative to said brackets, a connecting link means connecting said arm to the adjacent bracket, and means to vary the length of said connecting link means, said connecting link means comprising a plurality of interengaging threaded members.

19. In a brake arrangement for a railway car truck, a brake frame housing, coaxial extensions provided on opposite sides of said housing, a pair of spaced mounting brackets formed with quadrangular openings to receive said extensions, resilient pads disposed in said openings to engage and yieldably resist movements of the housing relative to said brackets, an adapter secured on the end of one of said extensions, a torque arm resiliently mounted for limited universal movement on said adapter to resist rotational movement of said housing relative to said brackets, a connecting link means connecting said arm to the adjacent bracket, and means to vary the length of said connecting link means, said connecting link means comprising a plurality of interengaging threaded members, one of said members being pivotally connected to said torque arm, a second of said members being pivotally connected to the adjacent mounting bracket, and an intermediate member connecting said other members whereby rotational movement of said intermediate member varies the length of the connecting link means.

20. In a brake arrangement for a railway car truck having a truck frame with spaced side rails and spaced transoms connected therebetween; the combination of a brake frame housing, coaxial extensions provided on opposite sides of said housing, a pair of spaced mounting brackets carried by a transom and formed with quadrangular openings to receive said extensions, resilient pads disposed in said openings to engage and yieldably resist movements of the housing relative to said brackets, an adapter secured on the end of of one of said extensions, a torque arm resiliently mounted for limited universal movement on said adapter to resist rotational movement of said housing relative to said brackets, a connecting link means connecting said arm to said transom, and means to vary the length of said connecting link means, said connecting link means comprising a plurality of interengaging threaded members, one of said members being pivotally connected to said torque arm, a second of said members being pivotally connected to said transom, and an intermediate member connecting said other members whereby rotational movement of said intermediate member varies the length of the connecting link means, and a latch mounted on said transom to engage said intermediate member.

CARL E. TACK.
WILLIAM J. CASEY III.

References Cited in the file of this patent
UNITED STATES PATENTS

| Number | Name | Date |
|---|---|---|
| 2,355,122 | Tack | Aug. 8, 1944 |
| 2,382,543 | Coombes | Aug. 14, 1945 |
| 2,416,869 | Eksergian | Mar. 4, 1947 |